United States Patent Office 3,189,470
Patented June 15, 1965

3,189,470
CERAMIC MICACEOUS MATERIAL
Roger A. Long, Escondido, Calif., assignor to Whittaker Corporation, a corporation of California
No Drawing. Filed May 29, 1961, Ser. No. 113,068
17 Claims. (Cl. 106—39)

The present invention relates to the composition and preparation of a micaceous ceramic material for high temperature applications, and more particularly to a ceramic material comprising a synthetic mica filler material, and a binder material which includes a refractory metal pyrophosphate.

Heretofore, high temperature materials characterized by electrical "transparency" for use in radomes and antenna windows of high speed aircraft and missiles have lacked appreciable structural integrity. The need for stronger, more temperature resistant materials has become quite critical, and various ceramic materials have been investigated for use in aircraft and missile radomes, antenna windows and like structures.

According to the present invention, a ceramic material is provided which is particularly suited for radomes and similar types of structures in that it has appreciable strength, withstands relatively high temperatures, and is electrically "transparent" for substantially distortionless transmission of high frequency microwaves, being characterized by minimum energy loss and minimum deflection or boresight error.

The present ceramic material is particularly characterized by maintenance of its strength and dielectric constant through a temperature range up to approximately 1000° F. Its moisture absorption is low, and it is relatively easy to prepare and fabricate into laminated and molded structures, utilizing either cold press and sintering, hot pressing, or melt and cast techniques.

The ceramic material takes three main forms: (1) a metal pyrophosphate binder in combination with a synthetic mica flake filler material; (2) a eutectic binder made up of a metal pyrophosphate and a synthetic mica flake combined with a synthetic mica flake filler material; and (3) a eutectic binder made up of a metal pyrophosphate and a refractory oxide or oxides combined with a synthetic mica flake filler material. It is noted that in each case the filler material is constituted by synthetic mica flake or micaceous crystals, and the metal pyrophosphate is a constituent of the binder. Neither of these materials is classed as a refractory material, manganese pyrophosphate and synthetic mica having melting and decomposition points, respectively, of approximately 2182° F. and 2350° F., it being noted that the filler always has a melting or decomposition point above that of the binder.

Metal pyrophosphates have an atomic bonding structure which imparts great strength to the ceramic material, and are desirably characterized by a predetermined melting point, and an ability to maintain hardness at elevated temperatures. Further, they have a desirably low shrinkage rate upon sintering subsequent to pressing.

Synthetic mica is used in preference to natural mica because the natural mica is not as stable at elevated temperatures, containing hydroxyl groups which form water at relatively low temperatures. The synthetic mica, on the other hand, does not include hydroxyl groups, these having been chemically replaced by fluorine which are more strongly bound compared to the hydroxyl groups of the natural mica. Consequently, the synthetic mica is much more thermally stable, not evolving water or gases at the elevated temperatures contemplated by the present invention.

In that form of the present material which employs a eutectic binder composition of a metal pyrophosphate and a synthetic mica flake material, the initial provision of the eutectic prevents subsequent dissolving or degradation of the added mica flake filler at or near the eutectic temperature. That is, since the pyrophosphate is in eutectic form, it has already combined with all of the synthetic mica with which it is capable of combining at that specific temperature. The resulting absence of combination with or attack upon the subsequently added mica filler preserves the flake integrity of the mica filler, and, consequently, the finished ceramic material is characterized by relatively high structural strengths However, as will be seen, the flake filler is sufficiently wetted by the pyrophosphate-mica binder for good bonding, without destroying the structural strength expected of a flake type of filler.

Other objects and features of the present invention will become apparent from the description hereinafter made.

MANGANESE PYROPHOSPHATE

The pyrophosphate employed preferably comprises manganese pyrophosphate ($Mn_2P_2O_7$), but it may comprise certain other pyrophosphates which either have a melting point less than the 2350° F. decomposition point of synthetic mica, or a melting point of less than 2350° F. in eutectic form with synthetic mica or certain refractory oxides to be described in greater detail hereinafter. Such additional pyrophosphates include: titanium pyrophosphate ($Ti_2P_2O_7$); iron pyrophosphate ($Fe_2P_2O_7$); zirconium pyrophosphate ($Zr_2P_2O_7$); nickel pyrophosphate ($Ni_2P_2O_7$); and the like.

Manganese pyrophosphate has a melting point of 2182° F., is insoluble in water, and has a density of 3.707 g./cc. It is a brownish-pink material which may be obtained by a variety of chemical processes, one simple process being the dehydration of hydrated manganese pyrophosphate ($Mn_2P_2O_7 \cdot 3H_2O$) by heating to a sufficiently high temperature to drive off the water of crystallization. Another process is the calcining of ammonium manganese phosphate ($NH_4MnPO_4$) to drive off the combined water and ammonia and force the chemical rearrangement to the pyrophosphate by the following reaction:

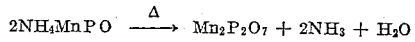

where time and temperature are the considered variables.

The process used is based on wet chemistry and the following procedure and reaction took place:

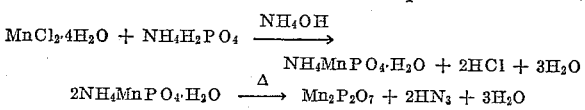

Initially, the above two salts are dissolved independently, the two solutions then mixed and thereafter precipitated with concentrated $NH_4OH$ solution. Satisfactory purity was obtained by several distilled water washings, checking the filtrate with silver nitrate solution for chlorine ion presence. Next, the washed material was calcined at 1400° F. for approximately one-half hour.

Calcination was carried out in a fireclay crucible in air using a furnace. The calcined material was then broken into pieces approximately ½ to ¼ inch, and ball milled until it would pass a −200 mesh screen.

Chemical porcelain and zircon crucibles were both satisfactory for melting the manganese pyrophosphate, it being noted that fireclay, alumina, and beryllia crucibles undesirably reacted with the manganese pyrophosphate and were, therefore, unsatisfactory.

ESTABLISHMENT OF EUTECTIC OF MANGANESE PYROPHOSPHATE AND REFRACTORY OXIDES

The above-prepared pyrophosphate is used in all of the three forms of the present invention, that is, in non-eutectic form with the mica; in eutectic form with mica subsequently combined with mica filler; or in eutectic form with a refractory oxide subsequently combined with a mica filler. Thus, the binder is a liquid phase binder and becomes a crystalline material, along with the mica filler, upon solidification.

In this latter form, the manganese pyrophosphate is blended with small particle refractory oxides which may include: alumina ($Al_2O_3$), obtained as −240 mesh alundum powder, zirconia ($ZrO_2$) obtained as a −325 mesh, semi-stable powder, Grade C, beryllia (BeO), obtained as −200 mesh GC Grade, titania ($TiO_2$) chromia ($Cr_2O_3$), obtained as approximately −200 mesh, thoria ($ThO_2$), obtained as −200 mesh, hafnia ($HfO_2$), obtained as −200 mesh, and magnesia (MgO).

The eutectic mixtures for the pyrophosphate and the refractory oxide may be established in a number of ways, one satisfactory way comprising: pressing the blended pyrophosphate and oxide powders at 4000 p.s.i. into ⅝ inch diameter by ½ inch cylindrical specimens, using various percentages of each of the oxides and the pyrophosphate for the several specimens; placing these specimens side by side in a zircon boat; and heating them in a furnace at a preselected temperature for 15 minutes. The specimens are then examined to determine which one of the specimens had just begun to flow or melt at the pre-selected temperature, as indicated by a slight rounding of the corners of the specimen, and that particular one of the melted specimens thereby indicates the approximate composition of the eutectic. Next, several more specimens are prepared with the percentages of oxide of each varying by, for example, 1%, and the test re-run to determine which of these just melts at the pre-selected temperature. Next, further specimens are prepared with slight variations between them, as respects the oxide composition, and the pre-selected temperature is then varied upwardly or downwardly, depending on the results of the previous tests, until the lowest temperature of melting or rounding of the corners is determined. This procedure gives an approximation of the eutectic composition, and was found to be quite reliable and accurate.

It was determined that for manganese pyrophosphate (−200 mesh), eutectic mixtures were formed at the following approximate temperatures for the approximate percentages, by weight, of the manganese pyrophosphate and the oxide:

*Table I*

| Eutectic composition | Eutectic temperature, °F. | Oxide melting point, °F. |
|---|---|---|
| 7.5% $Al_2O_3$, 92.5% $Mn_2P_2O_7$ | 1,987 | 3,720 |
| 11.0% $ZrO_2$, 89.0% $Mn_2P_2O_7$ | 2,015 | 4,890 |
| 5.5% BeO, 94.5% $Mn_2P_2O_7$ | 1,858 | 4,586 |
| 12.5% $TiO_2$, 87.5% $Mn_2P_2O_7$ | 1,910 | 2,984 |
| 4.75% MgO, 95.25% $Mn_2P_2O_7$ | 2,005 | 5,072 |
| 7.5% $Cr_2O_3$, 92.5% $Mn_2P_2O_7$ | 1,976 | 3,614 |
| 25.0% $ThO_2$, 75.0% $Mn_2P_2O_7$ | 1,906 | 5,522 |
| 16.5% $HfO_2$, 85.5% $Mn_2P_2O_7$ | 1,980 | 5,090 |

Of course, the percentage of the oxide in solution will increase with higher temperatures. It is noted that the eutectics set out are characterized by a melting point low enough for relatively easy preparation and part fabrication, and are yet high enough to be able to withstand temperatures approximately 2000° F. without deterioration. The above percentages and temperatures were derived by experimental techniques and are, therefore, only close approximations of the eutectic compositions and temperatures.

It was found that small percentages of certain materials in the pyrophosphate have a pronounced effect on the eutectic compositions at the various temperatures, and these materials should, therefore, be kept at a minimum for uniformity of results. However, a predetermined adjustment of such materials is another means for easily varying the eutectic melting point to tailor the melting point to the particular application at hand.

The most active of such materials or compounds in the manganese pyrophosphate appears to be one of the sodium phosphates, which constituted less than 10% by weight of the manganese pyrophosphate used in establishing the above experimental results. The effect of such sodium phosphates in lowering the eutectic melting point was confirmed by making additions to the pyrophosphate of between 10% and 20% by weight of $Na(PO_3)_3H_2O$ (sodium tri-metaphosphate monohydrate). The additions were found to effectively lower the eutectic temperature as expected.

A table is set forth below to show the variations in two different batches of commercially available $Mn_2P_2O_7$ due to the above-described impurities, percentages being by weight.

*Table II*

| $Na(PO_3)_3H_2O$ | M.P. of material, °F. | M.P. after washing, °F. | Percent alumina to form eutectic | Eutectic temp. |
|---|---|---|---|---|
| Batch #1 or #9 (pure $Mn_2P_2O_7$), 0% | 2,130 | 2,180 | 7.5 | 1,987° F. (1) |
| Batch #2, 10% | 1,660 | 1,885 | 2–10 | |

[1] All melted at 1,667° F.

PREPARATION OF EUTECTIC OF MANGANESE PYROPHOSPHATE AND REFRACTORY OXIDES

After determining the composition of the eutectic of manganese pyrophosphate and the refractory oxide, the preparation and powdering of the eutectic for later combination with the synthetic mica filler material was as follows. The manganese pyrophosphate (−200 mesh) was blended with the oxide (−200 mesh) from four to twelve hours in a rotating glass jar containing rubber balls.

The blended mixture was pressed into bricquets by a pellet press, which were thereafter melted in an electric furnace in air. The bricquets may also be melted in a vacuum induction furnace into which an inert gas is introduced to create a partial pressure. The induction heating of an electric furnace under vacuum eliminates the necessity of stirring because of the characteristic stirring of induction heating. Zircon and graphite crucibles were used to contain the material, and melting was effected by bringing the eutectic mixture to a temperature approximately 50 to 200° F. above the predetermined melting point of the eutectic being prepared.

The melted mass was immediately poured into cold water and the resulting frit dried and then ball milled in a rubber lined porcelain ball mill for particle reduction to at least −100 mesh or finer. Other non-contaminating ball mills could be used.

The combination of the above eutectic of manganese pyrophosphate and a refractory oxide with the synthetic mica filler will be described in detail hereinafter.

ESTABLISHMENT OF EUTECTIC OF MANGANESE PYROPHOSPHATE AND MICA

A procedure similar to that just described was also employed to determine the eutectic of manganese pyrophosphate (−200 mesh) and synthetic mica, and it was found that this eutectic occurred at approximately 1885° F. The composition of the eutectic was approximately 5% synthetic mica and 95% manganese pyrophosphate, by weight.

The synthetic mica employed in the present ceramic material is a fluoro-phlogopite which maintains its chemical stability in air to about 2250° F. and is decomposed at about 2350° F. The high temperature range of the material is apparently attributable to the fluoride replacement of hydroxyl groups which occur in the natural mica and which undesirably form gas or water at elevated temperatures. A suitable synthetic mica is sold as "Synthamica 202." It is in flake or crystalline form and has a melting point of 2492° F., an apparent density of 1.7 to 2.0 gms./ccm., a recommended temperature limit of 1832° F., and a tensile strength of 5000 to 10,000 p.s.i. It has a dielectric constant at one megacycle of 6.3, a dissipation factor at one megacycle of 0.0005 to 0.0020, and a volume resistivity (ohm/ccm.) of $5 \times 10^{15}$.

PREPARATION OF EUTECTIC OF MANGANESE PYROPHOSPHATE AND MICA

In preparing the eutectic synthetic mica and manganese pyrophosphate for subsequent use in combination with the synthetic mica filler, the composition of 5 wt. percent mica and 95 wt percent $Mn_2P_2O_7$ was prepared by blending the two materials for 16 hours. The particle size of both components was —200 mesh.

Induction heating and an AGX graphite crucible were used to melt this material after it had been pressed into bars weighing about 200 gms. each. No special atmosphere was used during the melting phase, although the eutectic mixture was heated as rapidly as possible to 100° F. above its melting point. The temperature was held after melting for a period of five minutes to insure complete solution and mixing, an optical pyrometer being used for the temperature determination. The melt then was immediately poured into a stirred water quench bath for fritting.

The frit was removed from the quench and washed in water. After drying, the frit was ball milled with porcelain grinding media in porcelain mill jars until is passed a —200 mesh screen. The material collected was stored in glass jars until needed for use.

ESTABLISHMENT OF OPTIMUM COMBINATIONS OF MICA FILLER WITH EUTECTIC AND NON-EUTECTIC FORMS OF MANGANESE PYROPHOSPHATE

After preparing the two forms of eutectic, as above-described, that is, manganese pyrophosphate and an oxide, and manganese pyrophosphate and synthetic mica, each of the forms was next blended with various amounts of synthetic mica flake filler to determine optimum formulations. This was done in a porcelain ball mill using spherical alumina balls, for a period of approximately one hour, and screened to obtain a —100 mesh mix. Approximately 1% by weight of ½%, 4000 cps. Methocel solution was then blended into the mix to achieve granulation of the ingredients and green strength.

The mix was then pressed into 1" diameter by ½" thick disk cylinders at pressures of 4000, 8000 and 10,000 p.s.i., and from subsequent strength tests, it was determined that 8000 p.s.i. gave consistently higher strengths than either the 4000 or 10,000 p.s.i. compacting pressures.

The pressed disks were dried, weighed and measured, and then placed in a kiln and subjected to various sintering temperatures from 1800 to 2400° F. for periods up to one hour. After sintering, the disks were withdrawn from the kiln and allowed to cool in air, and again weighed and measured. Slower heating and cooling methods may be used if it develops that the particular disk formulation is subject to failure from thermal shock.

The disks which were pressed at 8000 p.s.i. and sintered at the various temperatures were next examined for greatest density and minimum shrinkage, these criteria being used on the assumption that maximum strength is a function of maximum density, and that the lower the shrinkage the better the formulation will be to facilitate part fabrication. As the following table indicates, the optimum binder-filler formulation for synthetic mica filler and the non-eutectic form of the manganese pyrophosphate binder was approximately 80% filler and 20% binder (all percentages by weight):

*Table III*

| Composition | | Sintering temp., °F. (1 hr.) | No. spec. | Mod. of rup., p.s.i. | | Young's mod. E | Percent lin. shrink |
| --- | --- | --- | --- | --- | --- | --- | --- |
| $Mn_2P_2O_7$ | Mica | | | Ave. | Max. | | |
| 20 | 80 | 2,000 | 4 | 3,360 | 3,740 | $2.4 \times 10^6$ | —0.5 |
| 20 | 80 | 2,100 | 4 | 3,190 | 3,940 | -------- | 0.25 |
| 20 | 80 | 2,190 | 4 | 1,260 | 1,470 | -------- | —0.25 |
| 60 | 40 | 1,795 | 4 | 2,080 | 2,200 | -------- | —0.25 |
| 60 | 40 | 1,860 | 3 | 1,920 | 2,230 | -------- | 2.25 |
| 60 | 40 | 1,960 | 4 | 1,940 | 2,550 | -------- | 3.25 |
| 80 | 20 | 1,630 | 4 | 1,510 | 1,660 | -------- | 0.00 |
| 80 | 20 | 1,750 | 4 | 3,140 | 3,650 | $2 \times 10^6$ | 1.0 |
| 80 | 20 | 1,870 | 4 | 940 | 1,100 | -------- | -------- |

The strength data was obtained by pressing and sintering the various formulations into bar specimens measuring 3½" x 1⅛" x 3/16".

It was noted during these tests that when 10–15% by weight of the binder was used, the specimens sintered poorly, had low density and low strength. When the binder was increased to 30% by weight, the specimens showed a steady drop-off in strength with increasing sintering temperature, and there was a consistent and undesirable tendency of the higher percentage specimens to warp during sintering. Thus, as previously stated, the optimum percentage by weight for the binder falls in the approximate range of 15% to 25% and is preferably 20%.

The low shrinkage rate of the above 80%–20% formulation is very good, and is theorized to be due to good "wetting" or liquid phase sintering between the manganese pyrophosphate and the mica flakes.

The optimum sintering temperature for the straight manganese pyrophosphate binder, from the above Table III, is in the approximate range of 2175 to 2200° F., indicating that sintering should preferably be carried out at temperatures slightly in excess of the melting point of the binder to effect "wetting" and limited solution of the filler. Where the binder is manganese pyrophosphate in non-eutectic form, the melting point is approximately 2182° F. However, when the binder is a eutectic of manganese pyrophosphate and mica, the melting point is approximately 1885° F. The melting points of eutectics of manganese pyrophosphate and the various refractory oxides is set out in Table I.

If sintering is carried out at temperatures appreciably above the melting point of the binder, such as over approximately 200° F. higher, the mica flake filler's structural integrity is destroyed by erosion, that is, by going into solution with the binder. This is to be avoided in order to preserve the function of the mica as a filler. Limited erosion of the filler is theorized as being desirable to provide a good bond between the binder and the filler.

The dielectric data on the optimum 80% binder and

20% mica filler of Table III above was determined at various temperatures as follows:

Table IV

| Temperature, °F. | Dielectric constant, 10,000 megacycles | Loss tangent |
|---|---|---|
| (1) | 3.77 | 0.0123 |
| 480 | 3.77 | 0.0123 |
| 570 | 3.83 | 0.0123 |
| 660 | 3.86 | 0.0123 |
| 750 | 3.95 | 0.0184 |
| 840 | 3.98 | 0.0256 |
| 950 | 4.07 | 0.0371 |

[1] R.T. (80° F.)

A significant improvement in strength and density was noted for the optimum 80% binder—20% filler (by weight) formulation when the mica filler was employed in two particle sizes. Various percentages of relatively coarse and fine mica were used, and it was found that the finer 5 micron particle size provided better compressive strength, the coarser—200 mesh provided better density, and that a blend of the two was superior in both strength and density properties. Apparently, the finer mica flakes fill voids existing between the larger mica flakes and provide better structural continuity. The optimum mica particle formulation for the filler which constituted 80% by weight of the ceramic material was found to be approximately 35% of −200 mesh mica plus approximately 45% of the 5 micron mica, to yield the 80% total. Thus, the coarse mica constituted approximately 44% by weight, of the mica total, and the fine mica constituted approximately 56% by weight, of the mica total. Examples I and II below illustrate the strengths obtained with the two particle sizes of mica filler, with the straight $Mn_2P_2O_7$ binder, and with the eutectic of the $Mn_2P_2O_7$ and mica, respectively (percentages by weight):

EXAMPLE I

[80% synthetic mica (35%, −200 mesh; 45%, 5 microns), 20% $Mn_2P_2O_7$, −200 mesh]

| | R.T. | 600° F. | 800° F. | 1000° F. |
|---|---|---|---|---|
| Average density, gm./cm.³ | 2.01 | 2.02 | 2.01 | 2.09 |
| Average flex strength, p.s.i. | 3940 | 4,020 | 3,621 | 4,000 |
| Average modulus of elasticity, p.s.i. | 3.77×10⁶ | 4.38 | 3.98 | 3.81 |

EXAMPLE II

[80% synthetic mica (35%, −200 mesh; 45% microns), 20% mica-eutectic, −200 mesh]

| | R.T. | 600° F. | 800° F. | 1000° F. |
|---|---|---|---|---|
| Average density, gm./cm.³ | 2.07 | 2.13 | 2.15 | 2.09 |
| Average flex strength, p.s.i. | 4,440 | 4,420 | 4,490 | 4,090 |
| Average modulus of elasticity, p.s.i. | 4.4×10⁶ | 4.29 | 4.08 | 4.17 |

A typical formulation of mica filler with a eutectic of manganese pyrophosphate and a refractory oxide ($Al_2O_3$) is set forth in the following Example III, Example IV being $Mn_2P_2O_7$ without any filler for purposes of comparison (all percentages being approximate, and by weight):

EXAMPLE III

| | |
|---|---|
| Eutectic of $Al_2O_3$ and $Mn_2P_2O_7$ percent | 20 |
| Synthetic mica do | 80 |
| Sintering temperature °F | 2100 |
| Modulus of rupture p.s.i. | 4500 |

EXAMPLE IV

[100% $Mn_2P_2O_7$]

| | P.s.i. | Sintering temperature, °F. |
|---|---|---|
| (1) Modulus of Rupture | 2,540 | 1,900 |
| (2) Modulus of Rupture | 1,510 | 2,000 |

From the above, it will be seen that a ceramic material has been provided which is characterized by dielectric properties uniquely adapting the material for employment in radomes and similar types of structures. It has low density, good thermal shock resistance, excellent strength, electrical stability over wide ranges of temperatures and frequencies, good erosion resistance, and extremely low moisture absorption. Further, the ceramic materials according to the invention retain their strength and modulus of elasticity for prolonged periods, even upon substantial temperature increase.

While certain embodiments of the invention have been specifically disclosed, it is understood that the invention is not limited thereto, as many variations will be readily apparent to those skilled in the art, and the invention is to be given its broadest possible interpretation within the terms of the following claims, wherein the term "synthetic mica" is defined to be mica in which the hydroxyl groups of the natural mica have been replaced by fluorides or the like to provide elevated temperature stability.

I claim:

1. A ceramic material consisting essentially of: synthetic mica flakes intimately mixed with and bonded by a binder consisting essentially of a eutectic of manganese pyrophosphate and synthetic mica, said binder being present in an amount sufficient to effectively bond said mica flakes.

2. A ceramic material consisting essentially of: synthetic mica flakes intimately mixed with and bonded by a binder consisting essentially of a eutectic of manganese pyrophosphate and approximately 4% to 25% by weight of a refractory oxide, said binder being present in an amount sufficient to effectively bond said mica flakes.

3. In a ceramic material, the combination of: synthetic mica flakes intimately mixed with and bonded by a binder consisting essentially of a eutectic of manganese pyrophosphate and approximately 7.5% by weight of alumina, said binder being present in an amount sufficient to effectively bond said mica flakes.

4. A ceramic material consisting essentially of: a synthetic mica flake filler intimately mixed with and bonded by a binder of approximately 95% by weight of manganese pyrophosphate and approximately 5% by weight of synthetic mica flakes, said binder being present in an amount sufficient to effectively bond said mica flakes.

5. In a ceramic material, the combination of: approximately 80% by weight of synthetic mica flakes intimately mixed with and bonded by approximately 20% by weight of a binder consisting essentially of a eutectic approximately 95% by weight of manganese pyrophosphate and approximately 5% by weight of synthetic mica flakes, said 80% of flakes including approximately 44% by weight of crystals approximately −200 mesh size and approximately 56% by weight of crystals approximately 5 micron size.

6. The method of manufacturing a ceramic material comprising: blending approximately 5% by weight of synthetic micaceous flakes with approximately 95% by weight of finely divided manganese pyrophosphate; pressing said manganese pyrophosphate and said micaceous flakes, melting said manganese pyrophosphate and said micaceous flakes; reducing the melted material to a finely divided condition; blending the material so treated with micaceous flakes constituting approximately 80% by weight of the total blend, the melted and reduced material constituting approximately 20% by weight of the total blend; pressing the material so blended at a pressure of at least 4,000 pounds per square inch; and sintering the pressed material at a temperature of approximately 1800 to 2350° F.

7. The method of manufacturing a ceramic material comprising: blending, in eutectic proportions, a pyrophosphate in a finely divided condition, selected from the group consisting of manganese, titanium, iron, zirconium, and nickel, with a material in a finely divided condition, selected from the group consisting of micaceous crystals and refractory oxides; melting the pyrophosphate and selected material; reducing the blended material to a finely divided condition; blending the material so treated with micaceous flakes in an amount sufficient to effectively bond said micaceous flakes; and sintering the resultant material above the eutectic melting temperature.

8. A ceramic material of the crystalline type adapted for use in radomes, antenna windows and the like, consisting essentially of an intimate substantially homogeneous mixture of micaceous crystals and a binder, said binder being present in an amount sufficient to effectively bond said micaceous crystals, said binder being a eutectic of a metal pyrophosphate and a member selected from the group consisting of micaceous crystals and refractory oxides, said binder having a melting point less than the decomposition point of said micaceous crystals.

9. A ceramic material of the crystalline type for use in radomes, antenna windows and the like, consisting essentially of synthetic mica crystals intimately mixed with and bonded by a binder, said binder being present in an amount sufficient to effectively bond said micaceous crystals, said binder being a eutectic having a melting point less than the decomposition point of said crystals and consisting essentially of a metallic pyrophosphate and a member selected from the group consisting of micaceous crystals and refractory oxides.

10. The material of claim 2 wherein said refractory oxide is alumina.

11. The material of claim 2 wherein said refractory oxide is zirconia.

12. The material of claim 2 wherein said refractory oxide is beryllia.

13. The material of claim 2 wherein said refractory oxide is titania.

14. The material of claim 2 wherein said refractory oxide is magnesia.

15. The material of claim 2 wherein said refractory oxide is chromia.

16. The material of claim 2 wherein said refractory oxide is thoria.

17. The material of claim 2 wherein said refractory oxide is hafnia.

References Cited by the Examiner
UNITED STATES PATENTS

| | | | |
|---|---|---|---|
| 2,704,261 | 3/55 | Comeforo | 106—39 |
| 2,898,216 | 8/59 | Bray et al. | 106—65 |

TOBIAS E. LEVOW, *Primary Examiner.*

JOSEPH REBOLD, *Examiner.*